US005922045A

United States Patent [19]

Hanson

[11] Patent Number: 5,922,045

[45] Date of Patent: Jul. 13, 1999

[54] METHOD AND APPARATUS FOR PROVIDING BOOKMARKS WHEN LISTENING TO PREVIOUSLY RECORDED AUDIO PROGRAMS

[75] Inventor: Bruce Lowell Hanson, Little Silver, N.J.

[73] Assignee: AT&T Corp., Middletown, N.J.

[21] Appl. No.: 08/682,034

[22] Filed: Jul. 16, 1996

[51] Int. Cl.[6] .............................. H04M 3/56; H04M 3/50

[52] U.S. Cl. .......................... 709/206; 709/203; 709/217; 709/227; 709/228

[58] Field of Search ......................... 395/200.33, 200.36, 395/200.42–200.48, 200.57–200.59; 348/7, 12, 13; 379/93, 88, 202; 455/4.2, 5.1; 709/202–203, 205, 212–219, 227–229, 237

[56] References Cited

U.S. PATENT DOCUMENTS

| | | | |
|---|---|---|---|
| 5,668,863 | 9/1997 | Bieselin et al. | 379/202 |
| 5,732,216 | 3/1998 | Logan et al. | 709/46 |
| 5,740,304 | 4/1998 | Katsuyama et al. | 386/46 |
| 5,841,979 | 11/1998 | Schulhof et al. | 709/237 |

*Primary Examiner*—Zarni Maung
*Assistant Examiner*—Bharat Barot

[57] ABSTRACT

An audio service monitors the progress of a user as he or she proceeds through the service. The location in the service at the time of termination is detected and correlated with user and service identification information. As a result, a bookmark is created which enables the user to later resume the service at the point of prior termination.

30 Claims, 3 Drawing Sheets

103
AUDIO INFORMATION SERVICE PLATFORM
104
AUDIO CONTENT DATABASE
105
PERSONAL PROFILE DATABASE
110
BLOCK COUNTER
PROGRAM RETRIEVAL AND PLAYBACK MODULE
109
SERVICE CONTROLLER
107
SERVICE MENU MODULE
108
USER ID MODULE
106
ASR
PUBLIC SWITCHED TELEPHONE NETWORK
102
101
USER'S TELEPHONE

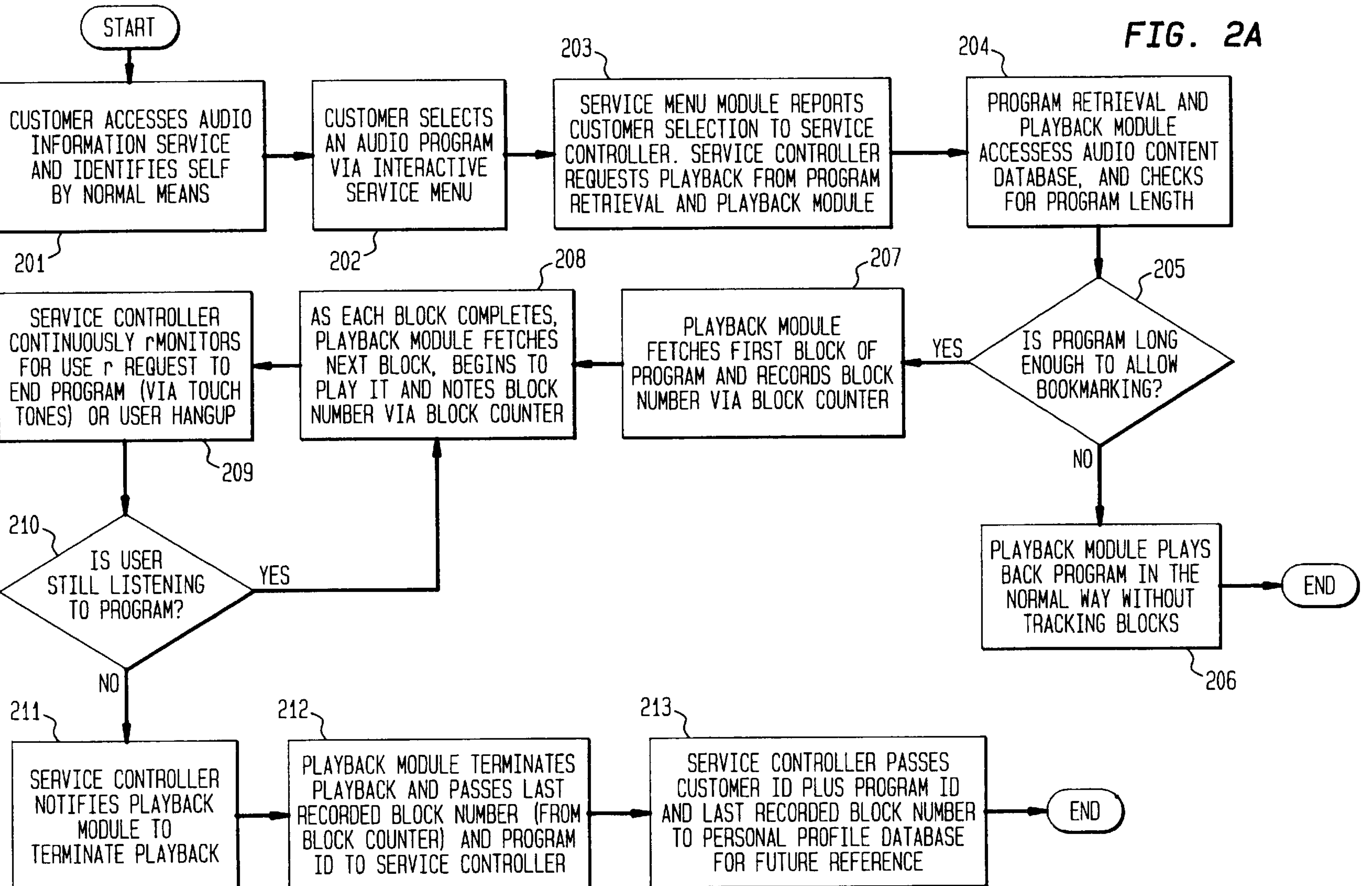
FIG. 2A
START
CUSTOMER ACCESSES AUDIO INFORMATION SERVICE AND IDENTIFIES SELF BY NORMAL MEANS
201
CUSTOMER SELECTS AN AUDIO PROGRAM VIA INTERACTIVE SERVICE MENU
202
SERVICE MENU MODULE REPORTS CUSTOMER SELECTION TO SERVICE CONTROLLER. SERVICE CONTROLLER REQUESTS PLAYBACK FROM PROGRAM RETRIEVAL AND PLAYBACK MODULE
203
PROGRAM RETRIEVAL AND PLAYBACK MODULE ACCESSESS AUDIO CONTENT DATABASE, AND CHECKS FOR PROGRAM LENGTH
204
IS PROGRAM LONG ENOUGH TO ALLOW BOOKMARKING?
205
YES
NO
PLAYBACK MODULE FETCHES FIRST BLOCK OF PROGRAM AND RECORDS BLOCK NUMBER VIA BLOCK COUNTER
207
AS EACH BLOCK COMPLETES, PLAYBACK MODULE FETCHES NEXT BLOCK, BEGINS TO PLAY IT AND NOTES BLOCK NUMBER VIA BLOCK COUNTER
208
SERVICE CONTROLLER CONTINUOUSLY rMONITORS FOR USE r REQUEST TO END PROGRAM (VIA TOUCH TONES) OR USER HANGUP
209
PLAYBACK MODULE PLAYS BACK PROGRAM IN THE NORMAL WAY WITHOUT TRACKING BLOCKS
206
END
IS USER STILL LISTENING TO PROGRAM?
210
YES
NO
SERVICE CONTROLLER NOTIFIES PLAYBACK MODULE TO TERMINATE PLAYBACK
211
PLAYBACK MODULE TERMINATES PLAYBACK AND PASSES LAST RECORDED BLOCK NUMBER (FROM BLOCK COUNTER) AND PROGRAM ID TO SERVICE CONTROLLER
212
SERVICE CONTROLLER PASSES CUSTOMER ID PLUS PROGRAM ID AND LAST RECORDED BLOCK NUMBER TO PERSONAL PROFILE DATABASE FOR FUTURE REFERENCE
213
END

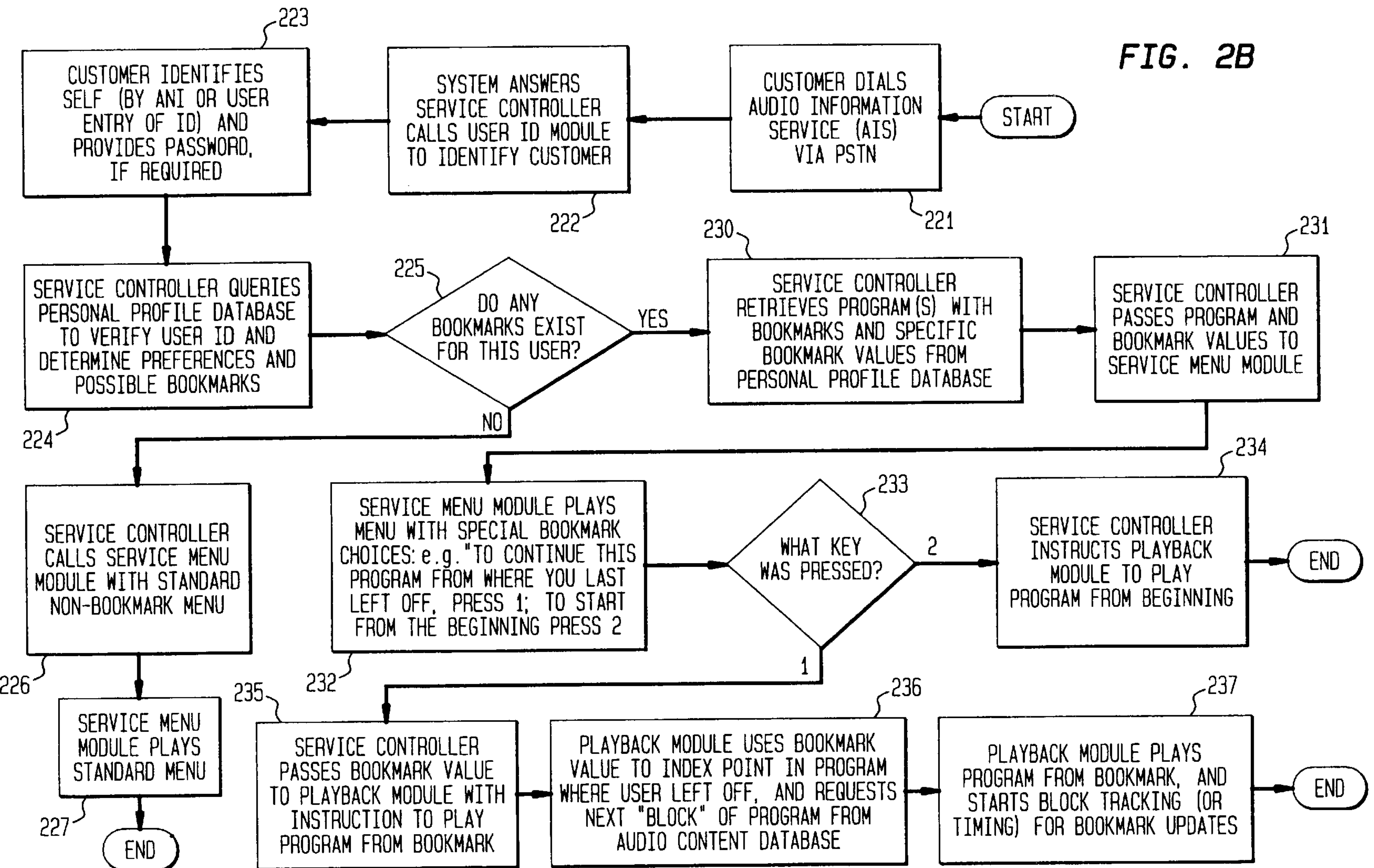
FIG. 2B
START
CUSTOMER DIALS AUDIO INFORMATION SERVICE (AIS) VIA PSTN
221
SYSTEM ANSWERS SERVICE CONTROLLER CALLS USER ID MODULE TO IDENTIFY CUSTOMER
222
CUSTOMER IDENTIFIES SELF (BY ANI OR USER ENTRY OF ID) AND PROVIDES PASSWORD, IF REQUIRED
223
SERVICE CONTROLLER QUERIES PERSONAL PROFILE DATABASE TO VERIFY USER ID AND DETERMINE PREFERENCES AND POSSIBLE BOOKMARKS
224
DO ANY BOOKMARKS EXIST FOR THIS USER?
225
YES
NO
SERVICE CONTROLLER RETRIEVES PROGRAM(S) WITH BOOKMARKS AND SPECIFIC BOOKMARK VALUES FROM PERSONAL PROFILE DATABASE
230
SERVICE CONTROLLER PASSES PROGRAM AND BOOKMARK VALUES TO SERVICE MENU MODULE
231
SERVICE CONTROLLER CALLS SERVICE MENU MODULE WITH STANDARD NON-BOOKMARK MENU
226
SERVICE MENU MODULE PLAYS STANDARD MENU
227
END
SERVICE MENU MODULE PLAYS MENU WITH SPECIAL BOOKMARK CHOICES: e.g. "TO CONTINUE THIS PROGRAM FROM WHERE YOU LAST LEFT OFF, PRESS 1; TO START FROM THE BEGINNING PRESS 2
232
WHAT KEY WAS PRESSED?
233
2
1
SERVICE CONTROLLER INSTRUCTS PLAYBACK MODULE TO PLAY PROGRAM FROM BEGINNING
234
END
SERVICE CONTROLLER PASSES BOOKMARK VALUE TO PLAYBACK MODULE WITH INSTRUCTION TO PLAY PROGRAM FROM BOOKMARK
235
PLAYBACK MODULE USES BOOKMARK VALUE TO INDEX POINT IN PROGRAM WHERE USER LEFT OFF, AND REQUESTS NEXT "BLOCK" OF PROGRAM FROM AUDIO CONTENT DATABASE
236
PLAYBACK MODULE PLAYS PROGRAM FROM BOOKMARK, AND STARTS BLOCK TRACKING (OR TIMING) FOR BOOKMARK UPDATES
237
END

METHOD AND APPARATUS FOR PROVIDING BOOKMARKS WHEN LISTENING TO PREVIOUSLY RECORDED AUDIO PROGRAMS

BACKGROUND OF THE INVENTION

The present invention is directed to providing a bookmark for audio programs. In one embodiment an audio service includes the capability of creating a user bookmark to enable a user to proceed through an audio program at that user's own pace.

It is known to provide telephone-based audio services over, for example, the Public Switched Telephone Network (PSTN). For example, it is known to provide call up services where a service user dials a particular number through the PSTN to obtain information. One example of such a service is a "900" service that enables a user to call a "900" number and receive the day-to-day comments of a celebrity or sports personality. Similarly, it is possible to provide an audio service in which the user will dial a designated number and have audio program information, such as news summaries, played back to the user through the PSTN.

The presently available audio services are somewhat limited in nature. In particular, audio-based services that provide serial information are not as powerful as they could be because the user is not provided with a way to select the appropriate pace with which they will proceed through the material. For example, there presently is no flexibility provided to the user for selecting a start point, or more importantly a restarting point if the user accesses a given audio service multiple times. In a typical service, if the user chooses to disconnect from the service at any point prior to the completion of the program material, the call terminates and the service takes no note of where or when the user terminated the access to the service. Connect time may be monitored for billing purposes, but no correlation is drawn to the user's progress through the audio program. If the user later reconnects to the service, the program material is cued to its initial starting point and the user must listen to the entire portion of the program material which was accessed earlier before returning to the point at which the service had earlier been terminated.

The present construction of these services limits their usefulness in providing audio services, such as audio books or audio "soap operas", since there is no possibility of quickly returning to the point at which the user had previously terminated the service. The user is discouraged from re-accessing such services.

For example, the user could with some difficulty return to the same part of a story or soap opera, at the cost of having to listen to the same program material again before proceeding on to new material. Thus, it would be advantageous if there were some technique provided for allowing a user to enjoy the audio services at a pace set by the user.

A similar problem arises in the context of audio program material that can be downloaded from a network audio service, e.g., a music program could be accessed via the Internet and downloaded to a user's PC. Upon playback of the program the user may decide to stop playing the program to pursue some other interest. It would also be advantageous if the PC could provide a technique for automatically positioning the playing back of the downloaded program to avoid having to search for the desired re-starting point.

SUMMARY OF THE INVENTION

The present invention provides a "bookmark" that permits a user who is reviewing audio program material to stop at any point in the program and to resume the review at the point at which the user previously stopped.

In accordance with an embodiment of the present invention, a user can access an audio information services platform through the PSTN. The platform has an audio content (program) database and a personal profile database. The user has an assigned user code. When the user connects to the audio information service platform, the user code is utilized to access information stored in the personal profile database. The stored information identifies the services previously accessed by the user and identifies the location within each audio service at which the user has previously terminated the service. The user can then select a desired audio service and request to be returned to the location in the audio service at which the previous access had been terminated.

In accordance with the embodiment the bookmark is generated by monitoring or tracking the progress of the user in reviewing the program material. In particular, a playback module may be coupled to a position location detector such as a block counter or timer. When the user terminates the access, the user ID, a service identifier and a last position location are grouped and stored in the personal profile database for later use.

By providing a bookmark for the audio services the user can better access and utilize audio books, multi-step programs such as stop-smoking programs, audio soap operas, travel direction services, or any serial presentation of information that lends itself to self-pacing by the user.

BRIEF DESCRIPTION OF THE DRAWINGS

FIG. 2A illustrates a flowchart for creating a bookmark in the audio service system of FIG. 1 in accordance with an embodiment of the present invention.

FIG. 2B illustrates a flowchart for using a bookmark created in FIG. 2A.

DETAILED DESCRIPTION

Figure 1:
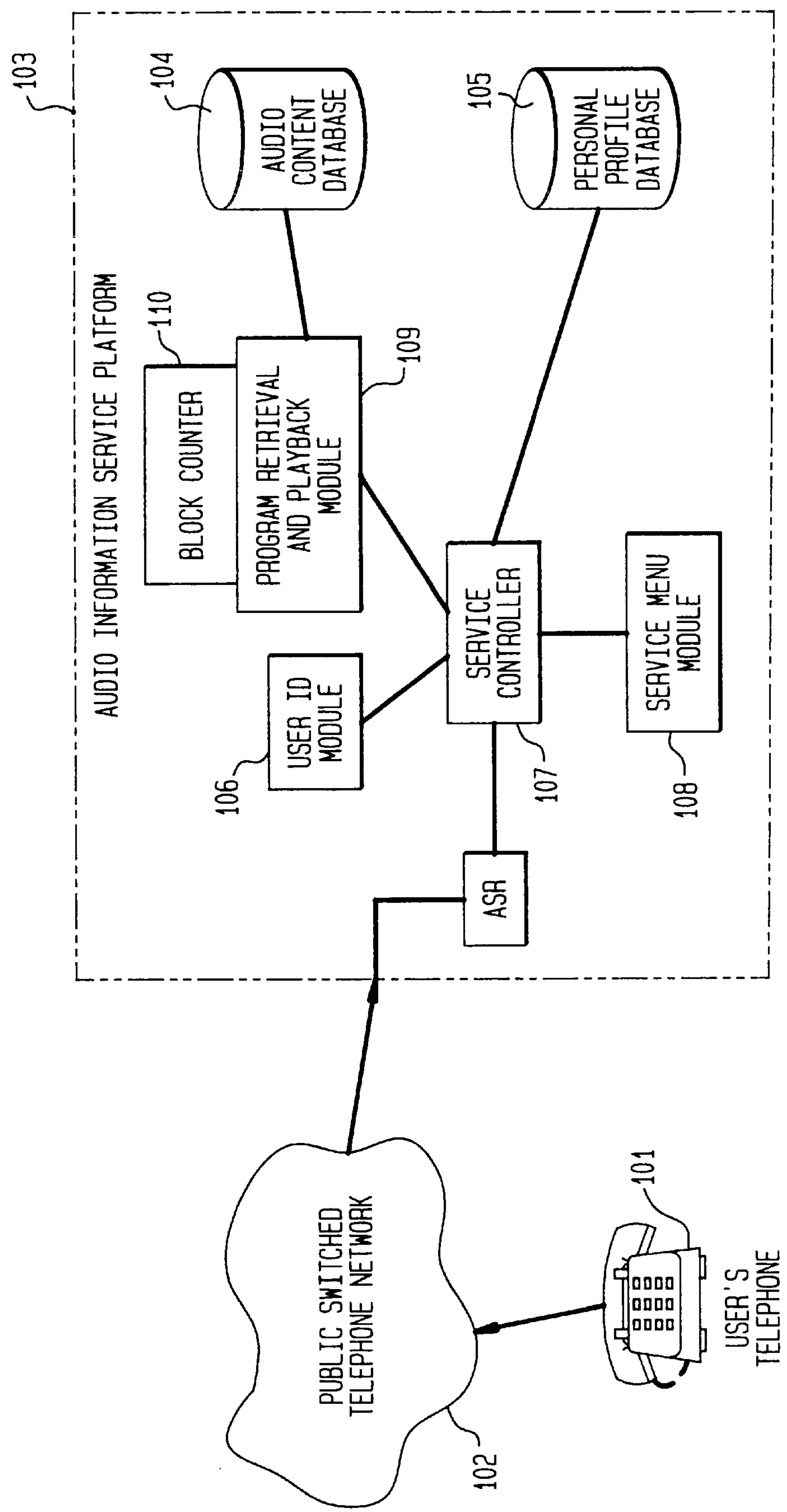
FIG. 1 discloses an audio information service system in accordance with an embodiment of the present invention.

FIG. 1 illustrates, in block diagram form, a system for providing an audio information service that includes bookmarks. The service provider has an audio information service platform 103 which is accessible through a Public Switch Telephone Network (PSTN) 102. Typically in such circumstances the platform is accessible by dialing a particular number, e.g., 800-XXX-YYYY, that is associated with the platform. The user can access the platform through the PSTN simply using the telephone 101. The telephone will include a keypad which enables the user to enter alpha-numeric codes represented by DTMF signals that can be transmitted through the PSTN 102 to the audio information service platform 103. One known audio services platform that does not include the bookmark capability is the CONVERSANT® system, belonging to Lucent Technologies, Inc.

In the present invention the platform 103 includes not only a database for audio content, 104 but a personal profile database 105 that stores information about the users of the service. A service controller 107 is a processing device which has the capability of controlling accesses to the personal profile database to obtain information about the users that are accessing the service platform. Alternatively, the service controller can arrange to have information about a user stored in their personal profile database 105.

The service controller 107 also interfaces with a program retrieval and playback module 109. This module is responsible for accessing audio from the audio content database 104 under the specific instructions of the service controller. For instance, the service controller will provide information to the module as to which audio content to obtain as well as identify the location within the audio content at which the service should begin. Typically each service will have an associated identifier or code that uniquely identifies the service and/or content. The service controller then arranges for the playback audio service to be routed to the appropriate user through the PSTN 102 to the user's telephone 101.

The service controller also interfaces with a service menu module 108 that provides information about the available audio services in the audio content database. Under the control of the combination of the service controller and the service menu module the user, upon connection to the platform, is given information about the available services and, as is described below, can be instructed about options for resuming previously accessed audio services.

The service controller could also interface with an Automatic Speech Recognition Unit (ASR) which operates to detect voice responses by the users to menu prompts, rather than detecting keypad or DTMF responses.

The service controller 107 also interfaces with a user ID module 106. This connection provides the service controller with information about the user including the identity of the user for use together with the personal profile database. User IDs are well known. One possibility for a user ID is the detection of the automatic number information (ANI) which can be transmitted by the PSTN 102 and which identifies the telephone number associated with the line connected to the user's telephone. Alternatively, the user can be prompted to provide a personal ID or a PIN so that the user can access the audio service from any location rather than be limited to accessing it from one particular telephone.

Finally, the audio information service platform 103 also includes a position detector, shown as a block counter in this embodiment, which is used in conjunction with the playback module 109 to monitor the user's progression through the audio service. The block counter provides useful information about where the user is in a selected audio service at any given time. This present position location information is then detected and associated with a user when the user terminates an audio service. The service controller can then provide the user information (user ID), service identification information (service ID) and termination location information to the personal profile database at the time the user terminates a service.

The entire audio service platform is operated with the service controller 107 operating under the control of a stored program for accessing the audio services, creating a bookmark and using an existing bookmark. The accessing of audio services itself is well known. However, the creation of a bookmark and the use of an existing bookmark is described below with reference to the flowcharts in FIGS. 2A and 2B.

One potential embodiment for creating a bookmark is described by the flowchart of FIG. 2A. In accordance with this operation, a customer first accesses the audio information service platform through the PSTN and the platform identifies the user either by detecting the ANI or by prompting the user to enter a PIN, step 201. The user then is provided with an interactive service menu and selects an audio program from the menu, step 202. The interactive service menu can operate in conjunction with an ASR and/or a DTMF detector to detect the user's responses to the menu prompts. The service menu module reports the selection of the audio service to the service controller 107 and in turn, the controller activates the playback module to request a playback of the desired audio service, step 203. The program retrieval and playback module 109 then acts upon the request from the service controller to access the audio content database 104 to select the desired audio service in accordance with the service ID associated with the selected service. The playback module 109 then can check the selected program for length, step 204. This can be done for instance by checking the file length or length information could be encoded into a header, for example. It may be determined in advance that certain programs are too short to warrant providing bookmarks to the user so that only selected programs will provide the bookmark capability. If that is the case, then having obtained the information identifying the length of the program, the playback module determines whether the program is long enough to warrant bookmarks, step 205. If the module detects that the service is not long enough to warrant bookmarks then the module will playback the program in the normal way without tracking the user's progress through the program, step 206.

If, however, the playback module detects that the program is long enough to warrant bookmarks, the playback module fetches the first block of the audio program and records the block number in the block counter 110 in step 207. As playback of a given block of the audio program is completed, the playback module fetches the next block in the sequence and begins to play it while updating the content of the block counter to ensure that the counter maintains an accurate indication of the block now involved in the playback process, step 208. Simultaneously, the service controller continuously monitors for a user request to end the program, step 209. The user can either terminate the program by selection of specified keys on the user telephone keypad or can simply hang up. If the user is still listening to the program as detected in step 210, then the operation recycles through steps 208 and 209 to ensure that the user continues to get additional blocks of the audio service and that the location of the user through the service is constantly monitored. If, however, the user is no longer listening to the program, then the service controller notifies the playback module to terminate the playback, step 211. At the time of termination the playback module passes the last recorded block number stored in the block counter as well as the program ID for the service in use to the service controller, step 212. The service controller then takes the location information and the program information and combines it with the customer or user ID which is detected in step 201 and records this information in the personal profile database 105 for future reference, step 213.

The creation of the bookmark is variable depending upon the type of program that is being provided to the user. Different types of programs lend themselves to different ways to monitor the user's progress through the program. For example, in a book environment it may be desirable to keep track of the user's progress through the book in terms of blocks that relate to either chapters, pages, or paragraphs. Then, as each element, for example paragraph, is accessed, the block counter is increased by one so that the system keeps track of which paragraph in the presentation the user is presently located. Alternatively, the program may be a multi-step improvement program, e.g., a stop-smoking program. In such a circumstance, it may be beneficial to detect the user's progress through the individual steps. In that case the blocks referred to in connection with FIG. 2A may in fact, correspond to the steps (or sub-steps) through the process or program. Additionally, it may be advantageous to detect the actual elapsed time of the audio program. This would be applicable to the actual playback of a continuous program where the system monitors the time (the number of minutes and seconds) that the user has progressed into the audio file. Therefore, the block counter 110 could be replaced by a timer and the timing information associated with the location of the user through the audio content could be then provided to the service controller at the time of termination. Then the timing information would be stored with the program ID, and the user ID in the personal profile database.

FIG. 2B illustrates a flowchart for use of the bookmark in connection with providing the audio service.

At the starting point the customer dials the audio information service via the PSTN, step 221. The system answers the user's call and the service controller 107 activates the user ID module to detect the identity of the user, step 222. As described above, the user module can either use ANI or the PIN specifically entered by a user to identify the user, step 223. The service controller then queries the personal profile database to verify the user ID and to determine whether any bookmarks exist and to determine, based on past experience with the user, whether the user has any particular audio service preferences, step 224. The controller then detects whether any bookmarks exist for the user in decision step 225. If no bookmarks exist for the user then the service controller calls the service menu module with a standard non-bookmark menu similar to the menu which was referred to above in connection with FIG. 2A, step 226. That menu provides the user with an identification of the audio information services that are available through that platform. The service module then plays the standard menu, step 227 and the process continues from step 203 of FIG. 2A.

If, however, the service controller detects that a bookmark has been created for this user then the service controller retrieves the program or programs with bookmarks and the specific bookmark values from the personal profile database, step 230. The service controller can then pass the identification information regarding the previously accessed services in which bookmarks exist to the service menu module, step 231. The service menu module then can (step 232): play a special menu that includes the programs that have bookmarks associated therewith; and, provide the user with the option of continuing the program from where the user last left off or to start the program from the beginning. In one embodiment the user indicates the choice by activating a corresponding key of the user's keypad to indicate the selection of the program and to select the location to begin playback of the program. The service menu module then indicates which selections the user has made, step 233. If the user has opted to begin a program from the beginning rather than from the place where the previous access was terminated, then the service controller instructs the playback module to play the program from the beginning, step 234, and the process continues from step 207 of FIG. 2A. If the user has indicated a desire to continue the program from where they last left off, the service controller passes the bookmark value to the playback module with the instruction to play the program from the bookmark, step 235. The playback module uses the bookmark value to index a point in the program where the user left off. The playback module then requests the next block of program from the audio content database, step 236. As indicated above, if the increments of the program are in time increments or step increments, the playback module would then proceed to mark the restart location according to the time or step information provided with the bookmark value. The playback module then begins to play the program from the bookmark and starts the block tracking or location monitoring for bookmark updates by carrying out the process from step 208 of FIG. 2A onward, step 237.

Of course, if the user selects a new service for which a bookmark has not yet been created, the operation of the system would continue from step 203 of FIG. 2A.

The above block diagrams and flowcharts show one embodiment for a system that provides audio services and creates and uses bookmarks in connection with providing those audio services. It should be recognized that various modifications to the embodiment are possible. For instance, it is possible that the service will be a revenue generating service. In such a circumstance the user may be prompted to enter information not only identifying the user but also may be prompted to provide information for billing purposes. This billing information can also be stored in the personal profile database. Of course, the user ID and billing information codes can be one and the same. As indicated above, the user may have the capability of indicating user preferences for types of audio services. This preference information can also be stored in the personal profile database and used to construct the appropriate menu to be provided by the service menu module. Similarly, it should be noted that the present invention is not limited to user telephones over a PSTN. Any kind of network that will support audio services can be an appropriate transmission medium for the audio service from the platform to the user (for example, a wireless network). Similarly, the user may employ a PC or other device or personal appliance to access the audio information service with, e.g., appropriate user ID information. As an example of an alternative application, a user may access an audio program or service via the Internet. In such a circumstance, available bandwidth may limit the viability of real-time audio program presentation. Thus, the more appropriate presentation would involve first downloading the program material to the user's PC where it would be stored for playback. Once the user begins to playback the program the PC could monitor the progress through the program material and generate the appropriate bookmark in a manner consistent with the techniques described above. Then when the user terminates the program and subsequently returns they will be given the option of where to re-start the program. The termination and creation of a bookmark are distinct from a pause functionality in that the termination actually releases the program and ends its execution. The pause function keeps the program indefinitely cued. Thus, the bookmark would be useful in this environment as well.

All of these capabilities are ancillary to the invention and are different techniques for employing that invention. The invention provides the capability of the user to proceed through an audio program at the user's own established pace and to return to the program and to the last location in the service at will. As a consequence, it provides the capability for creating and utilizing audio services that contain serial or continuous information in a more user friendly manner.

What is claimed is:

1. A method of facilitating a user's review of previously recorded audio program material over at least two review sessions, the audio program material having been communicated to the user over a communication network, the method comprising the steps of:

monitoring a user's progress in the user's review of audio program material during a first review session; and when the user terminates the first review session, storing in a memory associated with the audio program material an indication of the user's progress in reviewing the audio program material during said first review session, wherein said stored indication can be utilized in a second review session subsequent to the termination of said first review session.

2. The method of claim 1, further comprising the step of an audio program service furnishing said audio program material to said user over a communication channel.

3. The method of claim 2, wherein said communication channel comprises a data network.

4. The method of claim 2, wherein said communication channel comprises a telephone network.

5. The method of claim 2, wherein said communication channel comprises a wireless communication channel.

6. The method of claim 1, wherein said steps are implemented by a user's personal appliance.

7. The method of claim 6, wherein said audio program material is stored on CD-ROM.

8. The method of claim 1, wherein said steps are implemented by a communications network-based service.

9. A method of facilitating a user's review of previously recorded audio program material over at least two review sessions, the audio program material having been communicated to the user over a communication network, the method comprising the steps of:

monitoring a user's progress in the user's review of audio program material, said monitoring performed during a first audio program review session;

when the user terminates the first audio program review session, storing in a memory associated with the audio program material an indication of the user's progress in reviewing the audio program material during said first audio program review session;

in a second audio program review session subsequent to the termination of said first audio program review session, playing said audio program material to said user beginning from a position within said material based on said stored indication.

10. The method of claim 9, further comprising the step of an audio program service furnishing said audio program material to said user over a communication channel.

11. The method of claim 10, wherein said communication channel comprises a data network.

12. The method of claim 10, wherein said communication channel comprises a telephone network.

13. The method of claim 10, wherein said communication channel comprises a wireless communication channel.

14. The method of claim 9, wherein said steps are implemented by a user's personal appliance.

15. The method of claim 14, wherein said audio program material is stored on CD-ROM.

16. The method of claim 9, wherein said steps are implemented by a communications network-based service.

17. A method of creating a bookmark for use with an audio service that provides previously recorded sequential audio information comprising the steps of:

associating a user code with a user of the audio service;

monitoring a present location of the user in a sequence of audio information in an access to the audio service;

detecting a termination of the access to the audio service;

creating a termination code defining the present location of the user in said sequence at the time the termination is detected;

correlating the user code and the terminatng code; and storing the result of said correlating step in a memory associated with the audio service for later use.

18. The method of claim 17, wherein a service identifying code is associated with each audio service; and said step of correlating further includes the step of associating a service identifying code with said user code and said termination code.

19. The method of claim 17, wherein said step of monitoring comprises the steps of loading a register with an initialization value at the start of the service and updating the register as the audio information is presented.

20. The method of claim 19, wherein said audio information is divided into discrete blocks of information and wherein said step of updating includes the step of revising the contents of said register to hold a block identifier corresponding to the block of information being conveyed by the service at that time.

21. The method of claim 19, wherein said register stores the time elapsed from the beginning of the providing of the audio information.

22. A method of providing audio services using a bookmark comprising the steps of:

generating a menu of a plurality of audio services;

detecting a selection of one of said plurality of audio services;

transmitting previously recorded audio information from the selected audio service;

monitoring a user's position in the selected audio service as the corresponding audio information is transmitted;

detecting a termination of the selected audio service that occurs prior to completion of said service;

creating and storing in a memory associated with at least one of said plurality of audio services a bookmark that identifies a user, the selected service and the user's position in the selected service at the time of termination;

subsequently accessing said bookmark; and returning the user to the location of the selected service based on said bookmark.

23. The method of claim 22, wherein said selected audio service comprises a plurality of discrete blocks of audio information, each block having a unique block identifier wherein said step of tracking comprises the step of temporarily storing the block identifier of a discrete block of audio information as that information is transmitted.

24. The method of claim 22, wherein said step of monitoring comprises the step of monitoring an elapsed time from a time at which said transmitting step begins.

25. An audio information service platform for providing previously recorded audio information over at least two review sessions comprising:

an audio content database;

a personal profile database;

a program playback module coupled to said audio content database;

a playback position monitor coupled to said program playback module; and a service controller utilizing a user identifier, and storing an audio content identifier and a playback position identifier with said user identifier in said personal profile database in response to termination of a first review session, wherein said playback position identifier indicates a user's progress in reviewing audio information during said first review session and can be utilized in a second review session subsequent to the termination of said first review session.

26. The platform of claim 25, wherein said audio content database stores an audio information for a plurality of audio services.

27. The platform of claim 26, further comprising a service menu module, coupled to said service controller and identifying an audio service in said audio content database that is desired by a user.

28. The platform of claim 27, wherein said service menu module advises said service controller of a desired starting point for an identified audio service.

29. The platform of claim 25, further comprising a user ID module that identifies a service user and wherein said service controller searches said personal profile database for data relating to an identified service user.

30. The platform of claim 29, wherein said service controller is coupled to said program playback module to initiate a resumption of an audio program at a location defined by a playback position identifier associated with an identified service user in said personal profile database.

* * * * *

UNITED STATES PATENT AND TRADEMARK OFFICE

CERTIFICATE OF CORRECTION

PATENT NO. : 5,922,045 C1
APPLICATION NO. : 90/011368
DATED : September 4, 2012
INVENTOR(S) : Bruce Lowell Hanson It is certified that error appears in the above-identified patent and that said Letters Patent is hereby corrected as shown below:

Column 2, claim 41, line 39 of the printed Reexamination Certificate, delete "*41. The method of claim 40, wherein the length of the audio program material is determined before monitoring the user's progress in the user's review of the audio program material during the first review session.*"

Signed and Sealed this
First Day of January, 2013

David J. Kappos
*Director of the United States Patent and Trademark Office*

US005922045C1

(12) EX PARTE REEXAMINATION CERTIFICATE (9269th)

United States Patent

Hanson

(10) Number: US 5,922,045 C1

(45) Certificate Issued: Sep. 4, 2012

(54) METHOD AND APPARATUS FOR PROVIDING BOOKMARKS WHEN LISTENING TO PREVIOUSLY RECORDED AUDIO PROGRAMS

(75) Inventor: Bruce Lowell Hanson, Little Silver, NJ (US)

(73) Assignee: AT&T Intellectual Property II, L.P., Reno, NV (US)

Reexamination Request:
No. 90/011,368, Dec. 3, 2010

Reexamination Certificate for:

| | |
|---|---|
| Patent No.: | **5,922,045** |
| Issued: | **Jul. 13, 1999** |
| Appl. No.: | **08/682,034** |
| Filed: | **Jul. 16, 1996** |

(51) Int. Cl.
*H04M 3/487* (2006.01)

(52) U.S. Cl. ........................ 709/206; 709/203; 709/217; 709/227; 709/228

(58) Field of Classification Search ........................ None
See application file for complete search history.

(56) References Cited

To view the complete listing of prior art documents cited during the proceeding for Reexamination Control Number 90/011,368, please refer to the USPTO's public Patent Application Information Retrieval (PAIR) system under the Display References tab.

*Primary Examiner*—Cameron Saadat

(57) ABSTRACT

An audio service monitors the progress of a user as he or she proceeds through the service. The location in the service at the time of termination is detected and correlated with user and service identification information. As a result, a bookmark is created which enables the user to later resume the service at the point of prior termination.

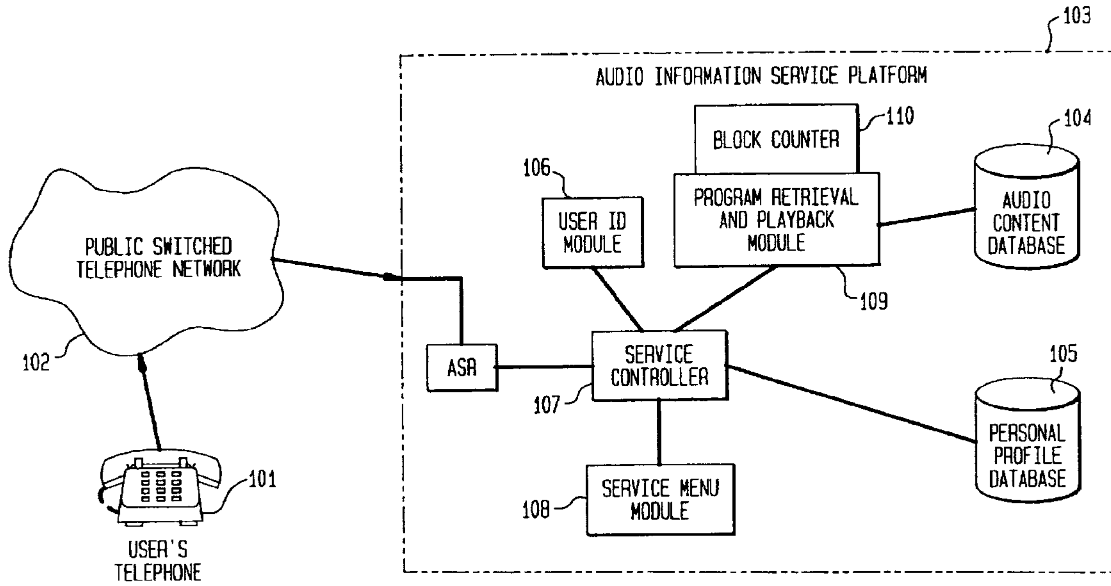

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-16 and 21-30 is confirmed.

Claim 17 is determined to be patentable as amended.

Claims 18-20, dependent on an amended claim, are determined to be patentable.

New claims 31-41 are added and determined to be patentable.

17. A method of creating a bookmark for use with an audio service that provides previously recorded sequential audio information comprising the steps of:

associating a user code with a user of the audio service;

monitoring a present location of the user in a sequence of audio information in an access to the audio service;

detecting a termination of the access to the audio service;

creating a termination code defining the present location of the user in said sequence at the time the termination is detected;

correlating the user code and the [terminatng] *terminating* code; and storing the result of said correlating step in a memory associated with the audio service for later use.

*31. The method of claim 1, wherein the user's progress in the review of the audio program material during the first review session is monitored by incrementing a counter.*

*32. The method of claim 1, wherein the user's progress in the review of the audio program material during the first review session is monitored by incrementing a timer in accordance with a time progressed into the audio program material.*

*33. The method of claim 1, further comprising:*

*monitoring for a user request to terminate the first review session during the first review session.*

*34. The method of claim 33, wherein the user request to terminate the first review session is a request to pause playback of the audio program material.*

*35. The method of claim 33, wherein the user request to terminate the first review session is a request to end execution of the audio program material.*

*36. The method of claim 1, further comprising:*

*receiving, by a computer, the audio program material over the communication network,*

*wherein the computer monitors the user's progress in the user's review of the audio program material during the first review session and stores in the memory the indication of the user's progress in reviewing the audio program material during the first review session.*

*37. The method of claim 36, wherein the computer monitors the user's progress in the review of the audio program material during the first review session by incrementing a counter.*

*38. The method of claim 36, wherein the computer monitors the user's progress in the review of the audio program material during the first review session by incrementing a timer in accordance with a time progressed into the audio program material.*

*39. The method of claim 1, further comprising:*

*transmitting, by an information service platform, the audio program material to the user over the communication network,*

*wherein the information service platform monitors the user's progress in the user's review of the audio program material during the first review session and stores the indication of the user's progress in reviewing the audio program material during the first review session in the memory when the user terminates the first review session.*

*40. The method of claim 1, further comprising:*

*determining a length of the audio program material.*

*41. The method of claim 40, wherein the length of the audio program material is determined before monitoring the user's progress in the user's review of the audio program material during the first review session.*

*42. The method of claim 1, wherein blocks of the audio program material are monitored when monitoring the user's progress in the user's review of the audio program material during the first review session.*

* * * * *